United States Patent [19]

Chubb

[11] Patent Number: 4,770,232
[45] Date of Patent: Sep. 13, 1988

[54] GAS PARTICLE RADIATOR

[75] Inventor: Donald L. Chubb, Olmsted Falls, Ohio

[73] Assignee: The United States of America as represented by the Administrator of the National Aeronautics and Space Administration, Washington, D.C.

[21] Appl. No.: 917,125

[22] Filed: Oct. 9, 1986

[51] Int. Cl.⁴ .......................... B64G 1/50; F24J 2/24
[52] U.S. Cl. ...................................... 165/41; 165/904; 126/443; 126/901
[58] Field of Search ............... 126/430, 436, 443, 450, 126/901; 165/41, 42, 904

[56] References Cited

U.S. PATENT DOCUMENTS

| | | | |
|---|---|---|---|
| 1,951,403 | 3/1934 | Goddard | 126/900 |
| 3,153,878 | 10/1964 | Smith, Jr. | 46/89 |
| 4,084,577 | 4/1978 | Rhodes | 126/443 |
| 4,250,958 | 2/1981 | Wasserman | 165/46 |
| 4,303,061 | 12/1981 | Torobin | 126/436 |
| 4,335,706 | 6/1982 | Passarelli et al. | 126/435 |
| 4,459,976 | 7/1984 | Speros | 126/430 |
| 4,469,088 | 9/1984 | Anzai et al. | 126/436 |

Primary Examiner—James C. Yeung
Attorney, Agent, or Firm—Gene E. Shook; John R. Manning

[57] ABSTRACT

A gas particle radiator adapted to operate in a microgravity space environment having a transparent boundary which transmits energy in the infrared spectrum, and a gas particle mixture that yields high absorption and emittances.

9 Claims, 1 Drawing Sheet

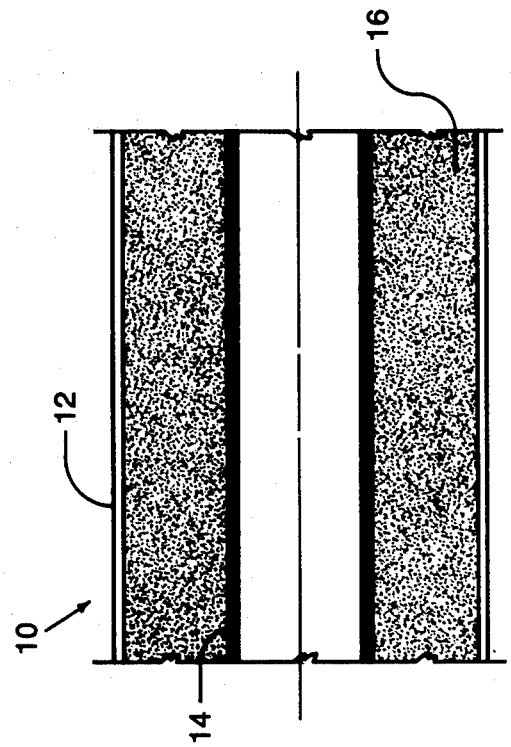

GAS PARTICLE RADIATOR

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention relates generally to radiators. The invention is particularly directed to an improved gas particle radiator (GPR) having high emissivity for use in a micro-meteroid environment of space.

In a micro-gravity environment of space, conventional radiators use emissive coatings to attain high emissivity. These coatings degrade with time so that the radiator emissivity is reduced. Also, adhesion of the coating to the radiator wall for long periods (7-10 yrs) is a difficulty. Further, prior art radiators are heavy due to very thick radiator walls which are designed to protect the radiator from meteriod damage. Generally, the largest mass portion of the tube radiator is the armor that must be used for a tube to protect it against micrometeroid penetration. An example of this type of device is a tube radiator. For a tube type radiator (either a heat pipe or a pumped loop) high emissivity is achieved by the use of emissive coatings. Adhesion and emissive stability of these coatings however must be maintained for long periods of time if a tube type radiator is to be a successful space radiator.

The gas particle radiator unlike the conventional types is a new concept characterized by a long lifetime, high emissivity, and a lower mass than the tube radiators.

It is, therefore, an object of the invention to provide an improved radiator suitable for operating in a space environment with high emissivity and low mass.

Another object of the invention is to provide a radiator that has a transparent boundary that protects the radiator from micro-meteroid penetration.

Still another object of the invention is to provide a radiator that uses a gas containing emitting, submicron particles as the radiating media.

DISCLOSURE OF THE INVENTION

According to the present invention a radiator has a gas particle emitting media and a transparent boundary that transmit energy in the infrared spectrum and protects the radiator from micro-meteroid penetration. The resulting radiator has an increased emissivity with long lifetime and low mass.

BACKGROUND ART

U.S. Pat. No. 3,153,873 to Smith, Jr. is directed to a flying soloarthermic toy airship which utilizes carbon blacked metal sheeting for absorbing and radiating heat.

U.S. Pat. No. 4,250,958 to Wasserman is directed to a thermal energy storage device comprised of tube elements for storing energy and a phase change material such as salt hydrate.

U.S. Pat. No. 4,335,706 to Passerarelli et al relates to an energy collector and transfering apparatus comprised of three connected closed loop conduit systems.

U.S. Pat. No. 4,469,088 to Anzai et al is directed to solar collector comprised of a glass tube, a thermal energy storage material preferably a molten salt, and a heat transfer fluid.

BRIEF DESCRIPTION OF THE DRAWING

The drawing is a sectional view illustrating a gas particle radiator in accordance with the present invention to be used in a micro-gravity space environment.

BEST MODE FOR CARRYING OUT THE INVENTION

Referring now to the drawing, there is shown a sectional view of the gas particle radiator 10 having a transparent boundary 12 spaced from a radiating surface 14. A sealed volume or plenum chamber 16 separates the boundary 12 from the radiator 14 by a distance of about 1 cm.

The chamber 16 contains a gas, such as helium or other inert gas, having a suspension of submicron particles, preferably carbon, for facilitating thermal energy absorption and radiation of the GPR. Helium is transparent to the emitted particle radiation. Also, its low molecular weight and thus high heat transfer coefficient imparts a negligible temperature difference between the helium and carbon particles. Preferred particle diameter range is from 0.02 $\mu$m to about 2 $\mu$m.

On startup of the GPR 10, a temperature gradient exists across the gas 16. This temperature gradient induces gas flow that distributes the particle throughout the gas. In the micro-gravity environment of space, the particle remain suspended and are uniformly distributed creating the high emissivity typically greater than 0.8.

Turning now to the transparent boundary 12 component, the boundary 12 material is critical to the invention. It provides high infrared transmittance and structural strength. The boundary 12 also enables the GPR 10 to maintain its high stable emissivity, and assures a longer GPR 10 lifetime of about 7 to 10 years in a micro-meteroid environment. Alkali halide doped with halide impurities for increasing boundary yield stress is the preferred boundary 12 material. Boundary 12 thickness, an important parameter, is less than about 1 mm.

In addition to containing the gas particle mixture 16, the boundary 12 also acts as a "bumber" to protect the radiator 14 from micro-meteroid penetration. Accordingly, if the boundary 12 is penetrated by a micrometeroid, the radiating gas particle mixture 16 is lost from that particular section of the radiator. However, the radiator 14 surface will remain operable, although at lower emissivity. For the conventional type radiator micro-meteroid penetration will make the effected section inoperable.

Further, the GPR 10 overall mass is considerably less than conventional radiators. Compared to a typical heat pipe radiator, the GPR 10 mass of about 265 Kg at an operating power level of 1.01 MW at 775° K. is about 31% less. Accordingly, the GPR of the present invention has a significant reduced mass advantage over the prior art.

Having thus described the individual components of the GPR, it will be appreciated that each of the components may be represented with various alternate embodiments. On the other hand, the critical boundary 12 material which provides high infrared transmittance and structural strength may also be fabricated of oxides of silicon, aluminum, magnesium, and mixtures thereof. Moreover, the chamber 18 gas containing radiating media may include particles of aluminum oxide, hafnium carbide, tungsten, or mixtures thereof. These par- ticles are also found to have very large absorptions and emittances required for GPR 10 applications in a microgravity space environment.

A preferred GPR embodiment according to the present invention is, therefore, comprised of a transparent boundary 12 fabricated preferably of an alkali halide, a helium-carbon gas particle mixture dispersed throughout the chamber 18 or sealed volume, and a radiating surface 14 spaced from the boundary 12 and protected by it.

While the invention has been described with reference to certain preferred embodiments thereof, those skilled in the art will appreciate various modifications, changes, omissions, and substitutions may be made without departing from the spirit of the invention. For example, a plurality of identical GPR 10 sections may be attached to form an extended version of the disclosed embodiment. It is intended therefore, that the invention be limited only by the scope of the following:

What I claim is:

1. A thermal absorbing and radiating apparatus adapted for use in the visible to the infrared spectrum and in a microgravity space environment, having a high specific power, long life time, high emissivity and low mass, comprising:

a transparent boundary adapted for transmitting energy in the visible to the infrared spectrum and for protecting said apparatus from meteroid damage;

a radiator spaced from said transparent boundary forming a plenum chamber therebetween; and a gas particle mixture dispersed and evenly distributed within said plenum chamber for facilitating thermal energy absorption and radiation and thereby enabling high emissivity of said apparatus to be achieved.

2. A thermal energy absorbing and radiating apparatus as claimed in claim 1 wherein said transparent boundary means comprises a material selected from the group consisting of:
   (a) alkali halides;
   (b) oxides of silicon;
   (c) aluminum;
   (d) magnesium; and
   (e) mixtures thereof.

3. A thermal energy absorbing and radiating apparatus as claimed in claim 1 wherein said gas particle mixture contains a suspension of particles of a material selected from the group consisting of:
   (a) carbon;
   (b) aluminum oxide;
   (c) hafnium carbide;
   (d) tungsten; and
   (e) mixtures thereof.

4. A thermal energy absorbing and radiating apparatus as claimed in claim 3 wherein said material particles are uniformly distributed in said gas thereby enabling high emissivity of said apparatus to be achieved.

5. A thermal energy absorbing and radiating apparatus as claimed in claim 1 wherein said radiator is spaced from said transparent boundary means by about 1 cm.

6. In a thermal energy absorbing and radiating apparatus of the type comprised of a transparent boundary means spaced from a radiator to form a plenum chamber therebetween and containing a gas dispersed within said plenum chamber, said apparatus adapted to operate in the visible to the infrared spectrum and in a microgravity space environment, the improvement comprising:

a suspension of particles uniformly distributed and dispersed in said gas for achieving high emissivity and facilitating thermal energy absorption and radiation.

7. In a thermal energy absorbing and radiating apparatus as recited in claim 6 wherein said particles are of a material selected from the group consisting of:
   (a) carbon;
   (b) aluminum oxide;
   (c) hafnium carbide;
   (d) tungsten; and
   (e) mixtures thereof.

8. In a thermal energy absorbing and radiating apparatus as claimed in claim 7 wherein said particles have a size range of from about 0.02 $\mu$m to about 2 $\mu$m.

9. In a thermal energy absorbing and radiating apparatus as claimed in claim 6 wherein said gas particle mixture contains a gas is selected from the group consisting of:
   (a) helium; and
   (b) inert gas.

* * * * *